United States Patent [19]

Miyata

[11] Patent Number: 4,702,833
[45] Date of Patent: Oct. 27, 1987

[54] FILTER APPARATUS

[75] Inventor: Toshio Miyata, Komaki, Japan

[73] Assignee: Kabushiki Kaisha Mitaka Kogyosho, Japan

[21] Appl. No.: 833,858

[22] Filed: Feb. 26, 1986

[30] Foreign Application Priority Data

Mar. 9, 1985 [JP] Japan ................................ 60-46974
Mar. 9, 1985 [JP] Japan ................................ 60-46975
May 23, 1985 [JP] Japan ................................ 60-112333

[51] Int. Cl.⁴ ............................................ B01D 29/38
[52] U.S. Cl. ............................. 210/333.01; 210/347; 210/410
[58] Field of Search ................... 210/333.01, 340, 341, 210/346, 347, 322, 410, 411, 425, 427

[56] References Cited

U.S. PATENT DOCUMENTS 2,720,314 10/1955 Booth ............................. 210/410

Primary Examiner—Frank Sever
Attorney, Agent, or Firm—Darby & Darby

[57] ABSTRACT

A filter apparatus is disclosed having a multi-stage filter tower and a plurality of liquid reservoirs, each reservoir having an approximately horizontal filter surface at its lower surface. The reservoirs are connected to each other centrally and in a vertical direction, with such communication causing an inflow clearance between the upper surface of each reservoir and the filter surface. The multi-stage tower is provided within a tank having a liquid inlet, a liquid outlet, and a drain spout, which are controlled by valves. The interior of the filter tower is connected with the liquid outlet of the tank and the filter tower has a head connected with a source of pressurized air via a valve arrangement. The apparatus according to the invention provides for the advantageous, economical and efficient washing of filter surfaces that become clogged during the filtration and purification process.

5 Claims, 5 Drawing Figures

FIG. I

FILTER APPARATUS

This invention relates to a filter apparatus which purifies a polluted solution such as a metal plate treating solution or the like, and more particularly, to a filter apparatus which is able to carry out the washing of filter members with ease.

BACKGROUND OF THE INVENTION

In a filter apparatus which purifies the polluted solution such as metal treating solution or the like, when the filter operation is continued, the filter member attached to the filter surface becomes clogged, which causes the inner pressure of the filter apparatus to increase, thereby lowering the efficiency of the filtration.

Then, when the filter member is exchanged or reused, these members must be washed. Although this washing operation is generally carried out by removing the filter member from the filter apparatus, such treatment is troublesome, particularly in removing the filter member from the filter apparatus and is not efficient.

Upon this, there is a method which washes the member automatically as it attaches to the filter apparatus as it is.

In the conventional method of this kind, the once purified liquid with said filter member is washed by the countercurrent of said purified liquid with a pump or the like, or by blowing air from the reversal direction.

However, since the former method is small in amount of flow per unit hour, an expected treatment of the reversal washing cannot be carried out even if the reversal washing is performed for a long period. Accordingly, in order to perform a fixed washing, the use of a large amount of purified liquid, a long driving time and the use of a large capacity of pump are necessary. This causes the defect of increasing the cost of apparatuses.

The latter necessitates to perform the washing after removing the pure liquid at the outlet side of the filter member. Accordingly, it lacks the quickness and necessitates a large air pressure. In addition, this has such a defect that the construction of the filter apparatus becomes complicated. Either of the methods cannot be said to be efficient.

Further, the conventional filter body used for filtration is one which disposes in tension a filter member such as cloth, paper or the like around a cylinder frame. For this reason, it takes much time to exchange said filter member because attaching it in a tightening state is very troublesome. Furthermore, in order to enable the winding operation thereof, the filter member is requested to be a soft material. Accordingly, it is difficult to apply a hard material such as a filter plate made of ceramic or the like.

SUMMARY OF THE INVENTION

The primary object of the present invention is to provide a filter apparatus having such function as being able to realize with simple construction, to use the purified liquid as little as possible, and to perform a high washing effect.

Another object of the present invention is to provide a filter apparatus which is possible to apply to a plane filter member and to attain a necessary filtration efficiency.

According to the present invention, a filter apparatus is characterized in that a multi-stage filter tower wherein a plurality of liquid reservoirs having an approximately horizontal filter surface at each lower surface thereof are connected in order at the central position thereof in a vertical direction being caused the inflow clearance between the upper surface of said liquid reservoir and the filter surface. Each inner portion of the liquid reservoir communicates at the connected portion thereof, and is provided in a tank having a liquid inlet, a liquid outlet and a drain spout, each of which being controlled to open or close by a control valve. The interior of said filter tower is connected with a pressurized air source through the control valve together with connecting the inner portion of said filter tower to said outlet of the liquid of the tank.

In the above apparatus the conventional filter operation is carried out by opening the inlet and outlet of said liquid and closing the drain spout and then supplying said liquid to be treated from said liquid inlet into the tank.

Said liquid to be treated flows into the filter tower through the filter surface of each filtration chamber of the multi-stage filter tower to be subjected to filtration through said filter surface and then is taken out from said outlet to the underside of the tank as a purified liquid.

When this filter operation is continued, the filter surface of the filter member is clogged, which causes the rise of liquid pressure in the tank, thereby interfering with the continuous operation of the filtration. Then the following washing step is initiated.

The washing step is carried out by the following order.

The first step:

The above drain spout is opened after closing the inlet and the outlet of the liquid. At this time, air forms bubbles and flows into the tank from said drain spout to discharge the liquid in said tank from the drain spout by atmospheric pressure. Further, said tank may be provided with an air passage valve to blow air into said tank through said valve.

On the other hand, the purified liquid in each liquid reservoir of said filter tower is enclosed in said reservoir without flowing down due to the function of the air pressure in the empty tank to said filter surface.

The second step:

Pressurized air is communicated to the filter tower.

By this, the purified liquid in the liquid reservoir suddenly falls down through the filter member due to the above pressure. By this reversal flow of the purified liquid, the filter dusts clogged in the filter member are removed to be washed.

BRIEF DESCRIPTION OF DRAWINGS

The attached drawings represent embodiments of the present invention, in which.

DETAILED DESCRIPTION OF THE PREFERRED EMBODIMENTS

Figure 1:
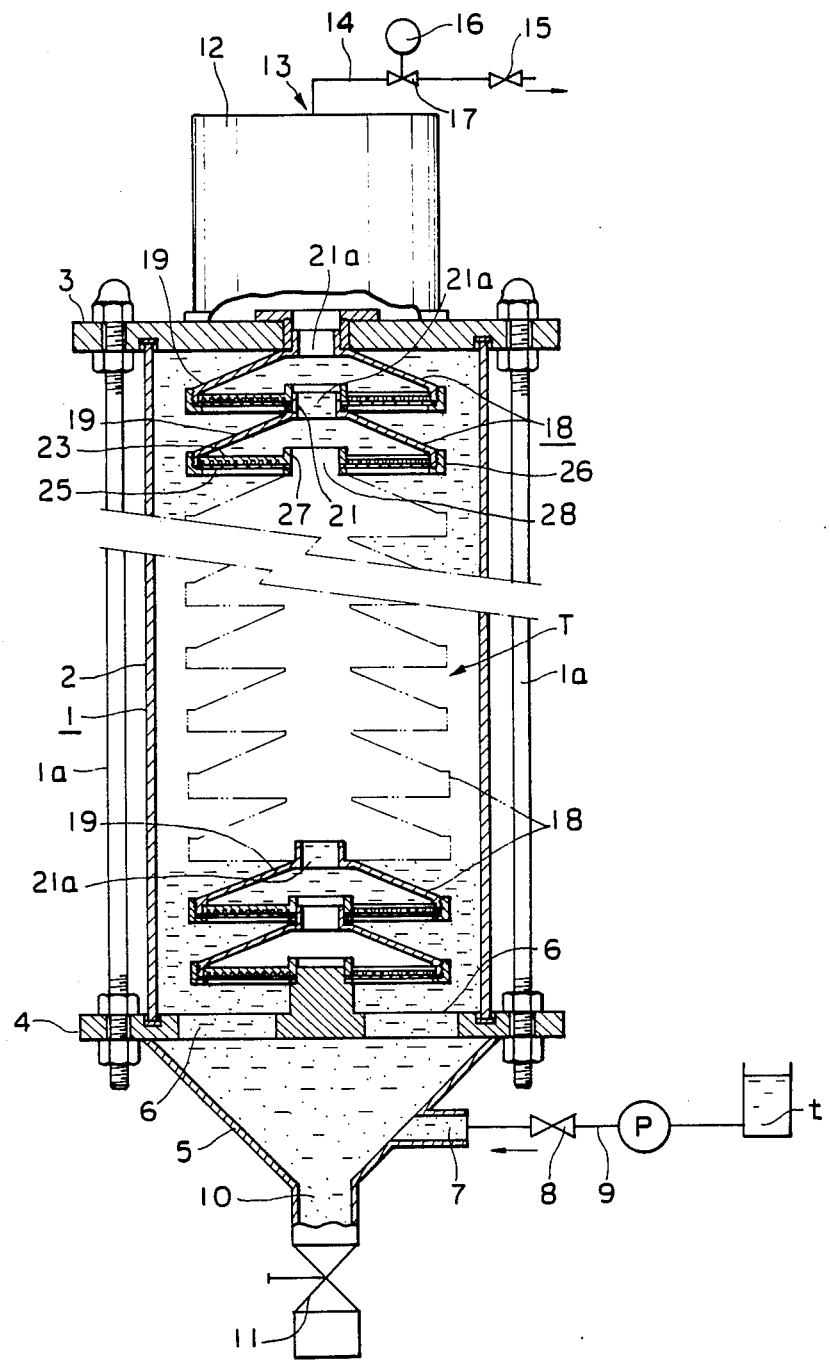
FIGS. 1 and 2 are vertical sectional side views of a first embodiment.
Figure 2:
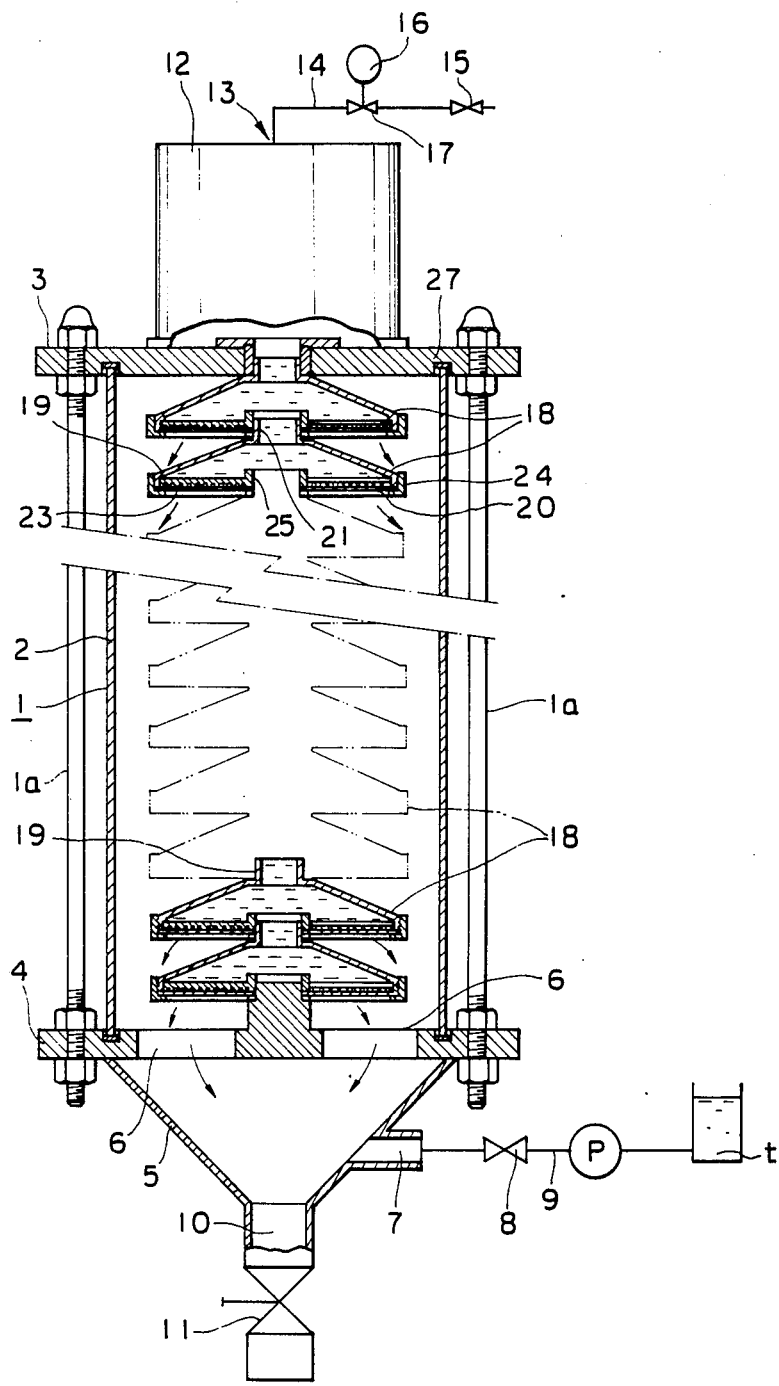

In FIG. 1, the reference numeral 1 is a long tank in the vertical direction wherein at the top and the bottom of a cylindrical body 2 made of a transparent material, an upper and a lower plates 3,4 are provided, said upper and lower plates 3,4 being combined by bridging a plurality of connecting rods 1a to combine fixedly. At the lower surface of said lower plate 4, a liquid receiving box 5 having a frustum of conical form is arranged and communicated to the inner portion of said tank 1 through an opening 6 formed at the lower plate 4. At the side of said receiving box 5, a liquid inlet 7 is provided, and further at the central portion thereof a drain spout 10 is provided in a right cylinder form. At the inlet 7 of said box, an inflow tube 9 controlled by an opening and closing valve 8 is communicated, said inflow tube 9 being connected with a pump p, thereby flowing out the liquid in a tank to be treated t into the tank 1 from the inlet 7. Further, said drain spout 10 is controlled by a control valve 11.

At the upper portion of said upper plate 3, an upper liquid reservoir 12 communicates with a filter tower T described hereinafter, the outlet 13 formed at said liquid reservoir 12 being connected with a tube passage 14.

The periphery wall of said liquid reservoir 12 is also made of a transparent material, whereby the filtration possibility is caused to be visually detectable by comparing the contamination of the liquid in said tank 1 with that of the liquid in the upper liquid reservoir 12.

An opening and closing valve 15 which controls the flow of the purified liquid and a changeover valve 17 which controls the change to an air source 16 where a pressurized air occurs are provided at said tube passage 14.

In said tank 1, a plurality of filter chambers 18 having "a soldier's camp helmet" form connected at the central position in said tank are arranged in the vertical direction, thereby constructing the filter tower T.

Figure 3:
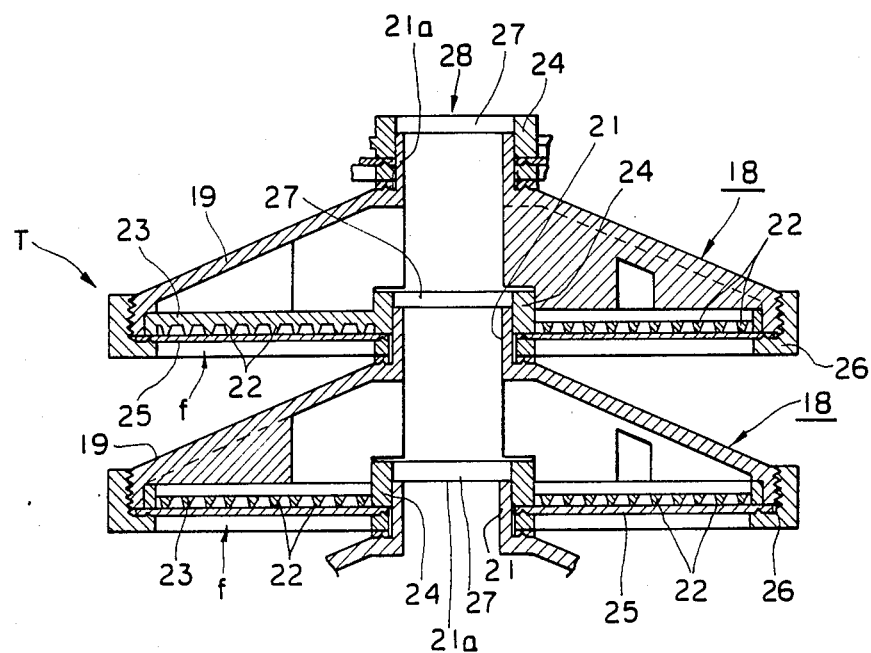
FIG. 3 is an enlarged vertical sectional side view of a liquid reservoir 18.

The constitution of said filter chamber 18 will be described referring to FIG. 3 in details.

The reference numeral 19 is a box having a "soldier's camp helmet" form having a plane inflow opening 20 at the lower surface thereof, and at the upper end of the central portion thereof a connecting tube 21 is protruded, said end portion thereof being formed the end portion 21a of the upper communicating passage. At the inflow opening 20, a filter material pressing 23 comprising a plurality of ring formed pressing pieces 22 arranged in concentrical forms, a filter member 25, and a supporting frame 26 maintaining said filter member 25 at the lower surface thereof screwing with around said box 19 are attached in order, and at the central portion thereof said connecting tube 21 forms an inserting portion 27 closely inserted from the lower portion by the connecting frame ring 24 of said filter member pressing 23 and the central hole of said supporting frame 26.

As said filter member 25, various kinds of plane filter members such as ceramic plate having innumerable filter holes, honeycomb construction or the like other than plane paper and filter cloth tensible in plane state are applicable.

Each filter chamber 18 composes a multi-stage filter tower T by laying one filter chamber on another one in multi-stage by insertion of a connecting tube 21 into the inserting portion 27, and a vertical tube passage 28 opening upward by said connecting tube is formed by intercept of the inserting portion 27 of the filter chamber 18 at the lowest end with the lower plate 4. Further, the communication spout end 21a of the filter chamber 18 at the most upper portion is communicated with the upper liquid reservoir 12.

Then, the function of said embodiment will be described as follows.

When the pump P is driven to supply the liquid to be treated to the tank 1 by opening the valve 8 and valve 15, such liquid flows into the filter chamber 18 through the filter member 25, thereby becomes a pure washing liquid.

In said filter operation, said tube passage 14 is communicated to the liquid tank t to be treated to circulate said liquid to be treated into the tank 1, whereby a sufficient filtration may be used.

Such filtration working is continued, said filter member 25 is clogged, thereby causing the increase of the water pressure in said tank 1.

Then, the following reverse washing step is initiated.

In other words, first, the closing and opening valves 8 and 15 are closed and after shutting the flow of the liquid to be treated, the opening and closing valve 11 of the drain spout 10 is opened.

When said drain spout 10 is opened, bubbles flow in from said drain spout 10 and the inner pressure of the tank 1 increases. By this, the ejection of the liquid from the drain spout 10 occurs corresponding to the increase of the pressure. Such inflow of the bubbles and the downfall of the liquid are repeated alternatively, and following this violent turbulent flows occur in the tank. Accordingly, the liquid level in the tank falls down and is washed by this turbulent flows, besides the outer surface of said filter member 25 is also washed.

After the liquid in the tank 1 flows down, the purified liquids in each filter chamber 18 and the upper liquid reservoir 12 are enclosed therein by closing of the valve 15, and by clogging of the filter member 25 and the action of the atmospheric pressure to the lower surface thereof, the flowing down of the purified liquid from the filter member 25 scarcely occurs.

Then, when the pressurized air of approximately 1 kg/cm$^2$ from the air source 16 is activated by the rotation of said change-over valve 17, the remaining purified liquids in said upper liquid reservoir 12 and each filter chamber 18 fall down rapidly through said filter member 25. By this, the filtrated materials clogged in the filter member 25 flow out together with the downfall of the purified liquid from the filter chamber 18, therby carrying out the washing of the filter member 25.

Further, in case of this falling down, at the beginning of the exchange of the change-over valve 17, the swelling of the liquid occurs at the lower surface of said filter member 25 due to the surface tension. When the balance between said surface tension and an air pressure breaks out, a phenomenon where the purified liquid flows down rapidly through the filter member 25 appears.

After said purified liquid flows out, the changeover valve 17 is exchanged and the valves 15,18 are opened, thereby supplying the liquid to be treated again to reopen the filter operation.

In the embodiment of the present invention, said upper communicated spout end 21a is formed by boring at the upper central portion of the box 19 and an inserting portion inserted into said upper communicated spout end 21a from the connecting frame ring 24 is formed, thereby being able to delete said connecting tube 21.

Then, a second embodiment of the present invention will be described with reference to the attached drawings.

Figure 4:
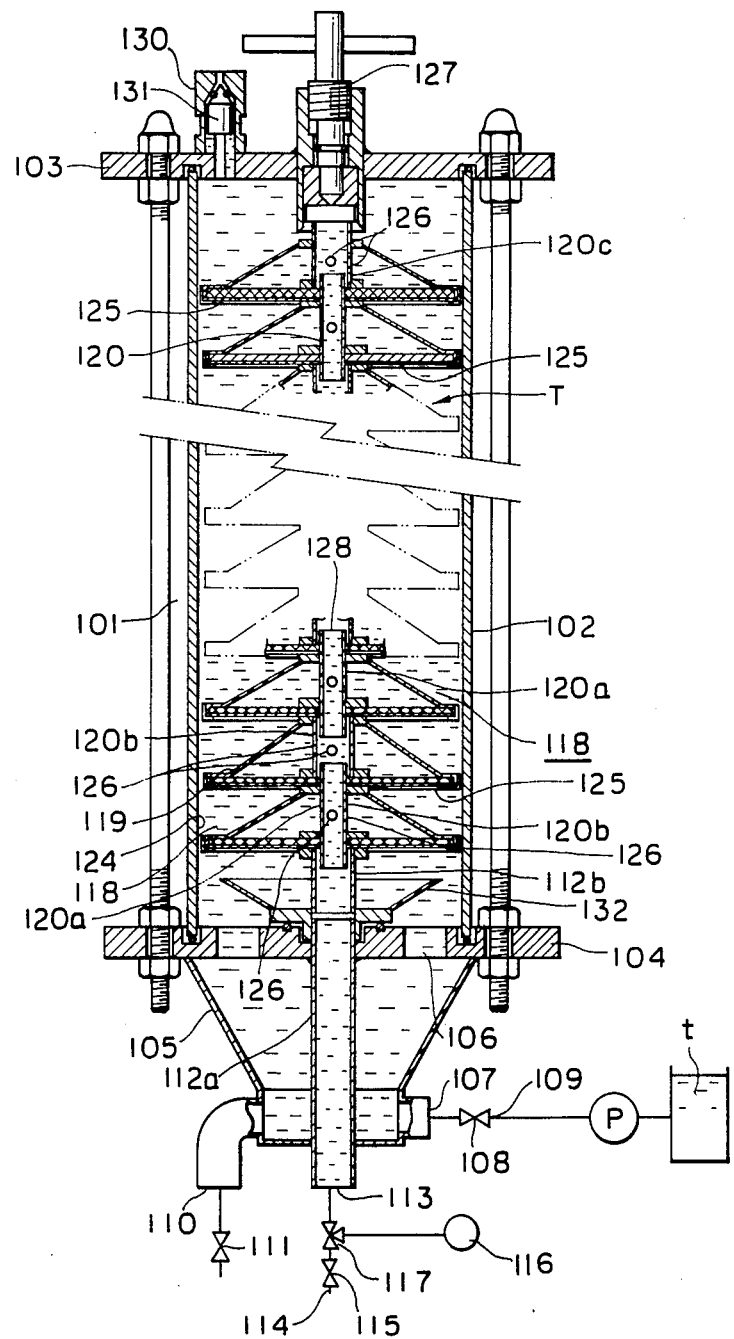
FIG. 4 is a vertical sectional side view of a second embodiment of the present invention.

In FIG. 4, an inflow spout 107 communicating with an inflow tube 109 controlled by an opening and closing valve 108 of a tank 101 and a drain spout 110 controlled by an opening and closing valve 111 are provided at the side of a liquid receiving box 105. Further, at a lower surface plate 104 and at the central portion of the liquid receiving box 105, a tube 112a which allows to flow down the purified liquid by communicating with a liquid reservoir 118 described hereinafter is inserted, said lower end forming a liquid outlet 113.

At an upper surface plate 103, an air inflow valve 130 is provided. Further, a float 131 is provided at the inner of said air inflow valve 130 and when the liquid is filled in said tank 101, said float 131 contacts by pressing with the inlet of the air inflow valve 130 to shut it, while the liquid in the tank 101 decreases a little, the shutting operation by said float 131 is released and said inlet communicates with the air, thereby applying the atmospheric pressure to the liquid in said tank 101.

Furthermore, on the central portion of said lower surface plate 104, a baffle plate 132 having dish form which opens toward the upper ward is placed thereon to cover above inlet holes 106 formed at the lower surface plate 104, thereby leading the liquid to be treated flows in from the inlet holes 106 in a periphery direction of the tank 101 as described hereinafter. At the central portion of said baffle plate 132, a short tube 112b is provided to correspond with said tube 112a at upper and lower portions in a placed state on said lower surface plate 104.

In the inner portion of said tank 101, there is provided the filter tower T wherein a plurality of liquid reservoirs 118 having "a soldier's camp helmet" form respectively are arranged in the vertical direction.

Figure 5:
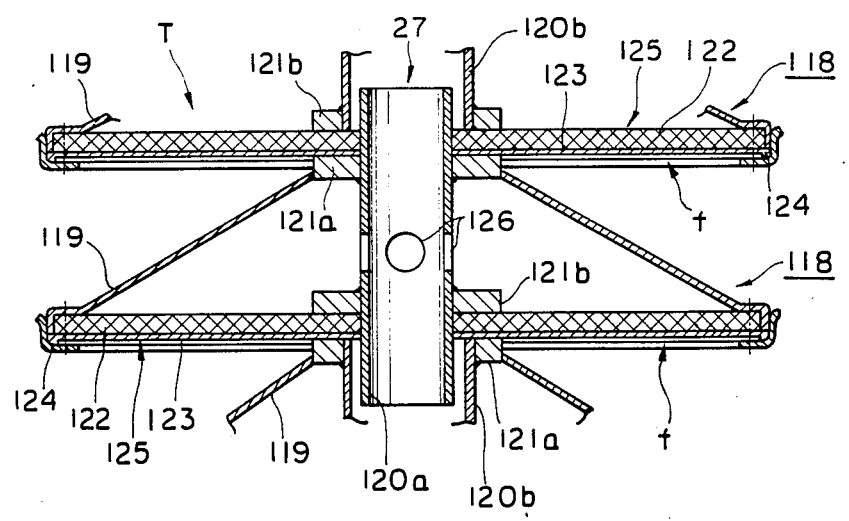
FIG. 5 is an enlarged vertical sectional side view of a liquid reservoir 118.

The constitution of said liquid reservoir 118 will be described with reference to FIG. 5 in more details.

The liquid reservoir 118 is constituted by arranging connecting tubes 120a,120b,120c, at the central portion of a frame body 119 having the "soldier's camp helmet" form provided with an inflow opening f at the lower surface thereof, welding an upper seat plate 121a inserted along the outer periphery of the connecting tubes, 120a,120b,120c to the upper opening of said frame body 119 and further covering the inflow opening f at the lower surface of said frame 119 with a filter member 125. The filter member 125 consists of a filter net 122 and a filter cloth 123, and is inserted along the outer periphery of said connecting tubes 120a,120b,120c to abut to the lower seat plate 121b fixedly inserted to said connecting tubes, and maintained by pinching its periphery edge with the periphery edge of said frame body 119 by a seat ring 124 to fix with bolts. Further, the interior of said liquid reservoir 118 is communicated with the interiors of connecting tubes 120a,120b,120c through the communicating hole 126 formed at connecting tubes 120a,120b,120c.

The liquid reservoir 118 consists of three kinds of connecting tubes 120a,120b,120c having different forms respectively. In other words, as shown in FIGS. 4 and 5, these are a slender connecting tube 120a having a slightly protruded portions at both ends in the upper and lower directions in the liquid reservoir 118, a connecting tube 120b having a large diameter insertable said connecting tube 120a therein and having no protrusion to the vertical direction regarding said liquid reservoir 118, and a connecting tube 120c having the same large diameter as in case of said connecting tube 120b, said upper end protruding slightly from the liquid reservoir 118 and closing its tube end.

Each liquid reservoir 118 inserts the connecting tube 120a thereof into the short tube 112b of the baffle plate 132, upon them the liquid reservoir 118 having the connecting tube 120b is inserted into the upper end of the connecting tube 120a to place thereon, further after one having connecting tube 120a and another one having connecting tube 120b are alternatively layered up at many stages. After the liquid reservoir 118 having the connecting tube 120c at the highest position is placed thereon, the upper end of said connecting tube 120c is allowed to fix by pressure at the lower end of a handle screw 127 by rotating said handle screw provided at the central portion of said upper surface plate 103, thereby being strongly maintained to be layered in the vertical direction of the central portion of the tank 101.

A vertical tube passage 128 is arranged in the vertical direction at the center of the tank 101 according to the connecting tubes 120a to 120c, short tube 112b and tube 112a by the laminated layer of such liquid reservoir group 118. Further, a tank passage 114 is connected with the liquid outlet 113 at the lower end of said vertical tube passage 128 (lower end of the tube 112a). The opening and closing valve 115 which controls the flow of the purified liquid and the change-over valve 117 which controls the exchange to the air source 116 where the pressurized air occurs are provided at the tube passage 114.

Then, the operation of said embodiment will be described as follows.

When the liquid to be treated flows in from the inlet 107 by opening the valves 108 and 115, the washing liquid flows in the tank 101 through the passage hole 106. Such liquid to be treated is subjected to the filtration by flowing into each liquid reservoir 118 of the filter tower T through the filter member 125 to become the purified liquid. At this time, since said passage hole 106 is caused to guide its flow in the periphery direction with the and of the baffle plate 132, the liquid flows into each liquid reservoir 118 approximately equally without causing any concentrated flow into the lower liquid reservoir 118 near said passage hole 106. The purified liquid filtered with the filter member 125 in said liquid reservoir 118 flows in the vertical tube passage 128 from the communicated hole 126 of the connecting tubes, 120a,120b and 120c, flows down through said vertical tube passage 128 and flows out to the necessary portions through the tube passage 114 from the liquid outlet 113.

When such filter operation is continued, said filter member 125 is clogged, thereby causing the water pressure increase in said tank 101. After detecting such pressure increasing with a pressure detecting means known per se, the following reverse washing step is initiated.

After intercepting the inflow of the liquid to be treated by closing the valves 108 and 115, the opening and closing valve 111 of the drain spout 110 is opened. However, even if said opening and closing valve 111 is opened, the liquid to be treated in the tank 101 flows out gradually from the drain spout 110 at the starting time because the interior of the tank 101 is intercepted from the external atmosphere. However, the float 131 of said air passage valve 130 is released from intercepting operation due to the lowering of the liquid level in the tank 101, the liquid surface communictes with the external atmosphere, thereby being subjected to the atmospheric affect. After this, the liquid to be treated is exhausted from the drain spout 110 promptly. After such liquid in the tank 101 flows out, the purified liquid in each liquid reservoir 118 is enclosed therein by the close of the valve 115 and does not flow down to the lower direction from the filter member 125 due to the act of the atmospheric pressure to the lower surface of the filter member 125.

Then, when the change-over valve 117 is exchanged and pressurized air of 1 kg/cm² from the air source 116 is acted, the purified liquid remained in said each liquid reservoir 118 and in the vertical tube passage 128 falls down from said filter member 125 repidly.

The filtrated materials clogged in the filter member 125 flows out by the flow of the purified liquid from said interior of each liquid reservoir 118 whereby the washing of the filter member 125 is performed.

When the change-over valve 117 is exchanged and the valves 115,108 are opened after flowing out of said purified liquid, the liquid to be treated flows in the tank 101, whereby the filter operation is initiated again.

In said first and second embodiments, said opening and closing valves, 8, 108, 11, 111, 17, 117, 15, 115 can be composed of electromagnetic valve respectively and said each step can be performed automatically by relating the opening and closing control of each valve with pressure detecting means provided in said tank 101.

Further, by filling various kinds of materials such as active carbon, glass fiber, ion exchanging resin or the like selectively in each liquid reservoir 118, the filter operation can be made to be the most appropriate one suitable to the characteristics of the liquid to be treated.

Heretofore, when a filter apparatus is made, the design and the production thereof are respectively performed corresponding to the necessary treatment capacity thereof.

From this reasons, this has such defects as a few in the common members between filters having different capacity of treatment and high in production cost of kinds of filters having small amount of production.

Further, in case of a filter member such as filter paper in the tank or the like, only one sheet of filter member having a wide area is almost used. Accordingly, when a part of the filter member is damaged due to the secular use, the whole exchange thereof is necessary, which necessiates a high maintenance expense.

On the other hand, since the filter chambers 18 and 118 in said embodiment compose of necessary number of layers, a filter apparatus having a necessary treatment capacity can be composed by providing the same number of layers thereof. By this, the filter chambers 18 and 118 can be used as the common members without necessity of individual design and execution for each apparatus, whereby the production becomes easy and its cost also becomes lower.

Further, when the filter members 25,125 are damaged, only the filter members 25,125 of the pertinent filter chambers 18,118 may be exchanged. Thus, even if several accident occur, one can manage with the minimum exchange of the parts. Therefore, the maintenance of the filter apparatus is easy.

Althouth the form of the filter chamber 18 in said each embodiment is "a soldier's camp helmet form", various kinds of forms such as disc or the like can be also used. In this case, when the filter chambers 18, as shown in said first embodiment, are layered, it may be used through a spacer.

Although said embodiment is composed of one filtration tower which layers a plurality of liquid reservoirs 118, several number of said filter towers may be provided in the interior of said tank 101 by enlarging the diameter of the tank 101.

Although the pressurization to the liquid reservoir 118 is performed by the air supply from the air sources 16,116 communicated with the tube passages 14,114, various kinds of constitutions such as providing the tube passages for pressurization separately or the like can be proposed.

By changing the pressurizing air to the atmospheric pressure changing the air source which communicates with each liquid reservoir 118 to the external air, the atmosphere may be induced through the change-over valves 17,117. By such communication of the atmospheric pressure the liquid in the chamber is caused to flow down from said filter member 125 by the load itself.

Said drain spouts 10,110 may be used for the liquid inlets 7,107. In this case, the tube passages 14,114 may be provided with a change-over valve for exchange to the drain tube passage.

Since the present invention enables, as described above, to carry out the washing of the filter member 125 caused by the clogging of said filter member with the aid of the outflow of the purified liquid in said liquid reservoir 118.

(1) It is not necessary to control the amount of reverse flow of the purified liquid and its reverse flowing times. Further, there is no need of operation such as one to open the tank at the time of washing. For this purpose, the automation of the control of the filtration is optimum.

(2) The washing time is short, the amount of use of the purified liquid is little and the washing effect per unit weight of the purified liquid used is high. Accordingly, the filtration time in a filtration cycle becomes longer and the filter efficiency is also high.

(3) The air source 116 can manage with a small capacity because the direct washing due to the pressurized air thereof is not carried out. Further, if the atmospheric pressure is used in place of said pressurized air, the air source 116 may not be necessary. Accordingly, the cost of the apparatus becomes low.

Furthermore, since the present invention is, as described above, carries out the filtration by the filter tower T composed of a plurality of stages of the filter chambers 18 having a plane filter surface in each, the following excellent effects can be obtained.

(4) Various kinds of materials such as hard filter plates or the like can be applied because the filter member 25 applied to the filter surface is a plane form.

(5) The form of the filter member can be selected variously by being corresponding to the form of said inflow opening f such as round plate, rectangular plate, polygon plate or the like.

(6) The attaching of the filter member 25 is easy.

(7) Due to the multi-stage of the filter chambers 18, a desirable filtration capacity can be attained without performing a large-sized apparatus.

What is claimed is:

1. A filter apparatus comprising:
    a plurality of liquid reservoirs housed within a tank and forming a multi-stage tower, each reservoir having a central portion, an upper and lower surface and an approximately horizontal filter surface proximate to the lower surface,
    an inflow clearance between each said upper surface and each said filter surface, a plane inflow opening at each said lower surface communicating with said filter surface, conduit means connecting the central portion of each reservoir to its neighboring reservoir in a vertical direction, said conduit means permitting internal communication between neighboring reservoirs, a liquid inlet and inlet valve adapted to selectively supply said tank with a liquid, a liquid outlet and outlet valve adapted to selectively discharge said tank, a drain spout and drain valve adapted to selectively drain said tank, and a pressurized air source selectively communicating with the interior of said multi-stage tower via said liquid outlet, and controlled by a change-over valve, said air source being sufficient to generate a turbulent flow and a downfall of liquid within said tower.

2. A filter apparatus according to claim 1, wherein each said inflow opening opens downwardly around said conduit means proximate to said lower surface of each said reservoir, said inflow opening being covered by a filter member comprising said filter surface, and wherein said conduit means removably join each neighboring liquid reservoir.

3. A filter apparatus according to claim 1, wherein the upper surface of said reservoir is formed as a conical inclined surface that inclines over the distance between said conduit means joining said reservoir with its upper and lower neighbors, said conical inclined surface forming said upper surface of said reservoir and defining said inflow clearance.

4. A filter apparatus comprising:
a plurality of liquid reservoirs housed within a tank and forming a multi-stage tower, each reservoir having a central portion, an upper and lower surface and an approximately horizontal filter surface proximate to the lower surface, conduit means connecting the central portion of each reservoir to its neighboring reservoir in a vertical direction, said conduit means permitting internal communication between neighboring reservoirs, cleansing means for selectively washing said filter surfaces with a turbulent flow provided by an inflow of air and a downfall of liquid within said tower.

5. A filter apparatus according to claim 4, wherein said cleansing means comprises:
an inflow clearance between each said upper surface and each said filter surface, a plane inflow opening at each said lower surface communicating with said filter surface, a liquid inlet and inlet valve adapted to selectively supply said tank with a liquid, a liquid outlet and outlet valve adapted to selectively discharge said tank, a drain spout and drain valve adapted to selectively drain said tank, and a pressurized air source selectively communicating with the interior of said multi-stage tower via said liquid outlet, and controlled by a change-over valve, said air source being sufficient to generate a turbulent flow and a downfall of liquid within said tower.

* * * * *